Dec. 4, 1923.

C. G. WOOD 1,475,979

CLUTCH OPERATING MECHANISM.

Filed July 18, 1921

Inventor
Clarence G. Wood
George J. Ottsch
By
Attorney

Patented Dec. 4, 1923.

1,475,979

UNITED STATES PATENT OFFICE.

CLARENCE G. WOOD, OF MUNCIE, INDIANA, ASSIGNOR TO HOOSIER CLUTCH COMPANY, OF MUNCIE, INDIANA, A CORPORATION OF INDIANA.

CLUTCH-OPERATING MECHANISM.

Application filed July 18, 1921. Serial No. 485,637.

*To all whom it may concern:*

Be it known that I, CLARENCE G. WOOD, a citizen of the United States, residing at Muncie, in the county of Delaware and State of Indiana, have invented certain new and useful Improvements in Clutch-Operating Mechanism, of which the following is a specification.

The invention relates to clutch operating mechanisms of the type wherein pivoted levers are utilized for forcing clutch elements into frictional engagement, and has for its object to provide bell crank and link connections between the inner ends of operating levers and a slidable cone, with which cone rollers carried by one of the arms of the bell crank levers engage. The cone forms means whereby one of the arms of the bell crank levers and the links which connect said levers to the clutch operating levers are moved towards alignment during a clutch operating movement of the cone.

With the above and other objects in view the invention resides in the combinaion and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
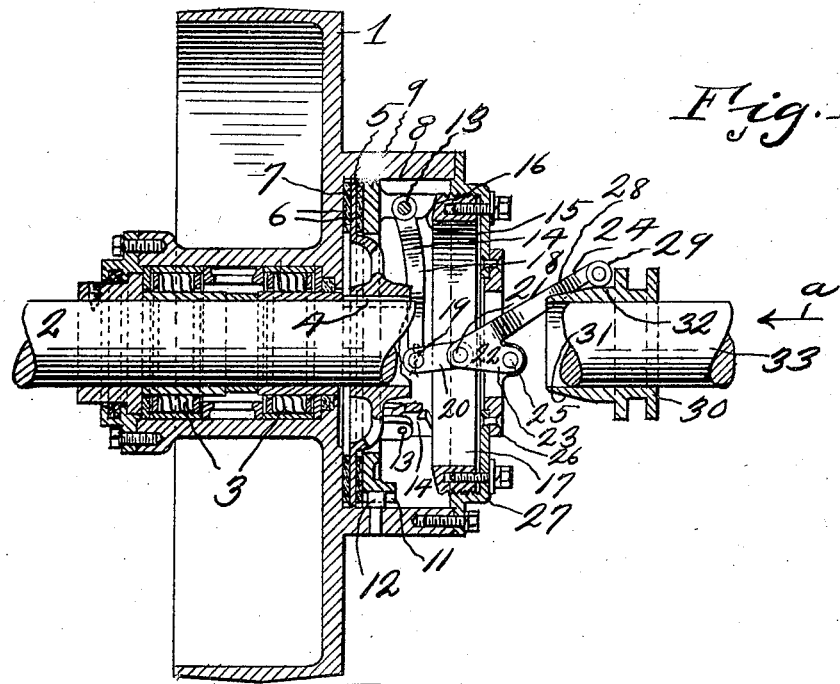
Figure 1 is a vertical longitudinal sectional view through the clutch, showing the same in connection with a pulley.
Figure 2:
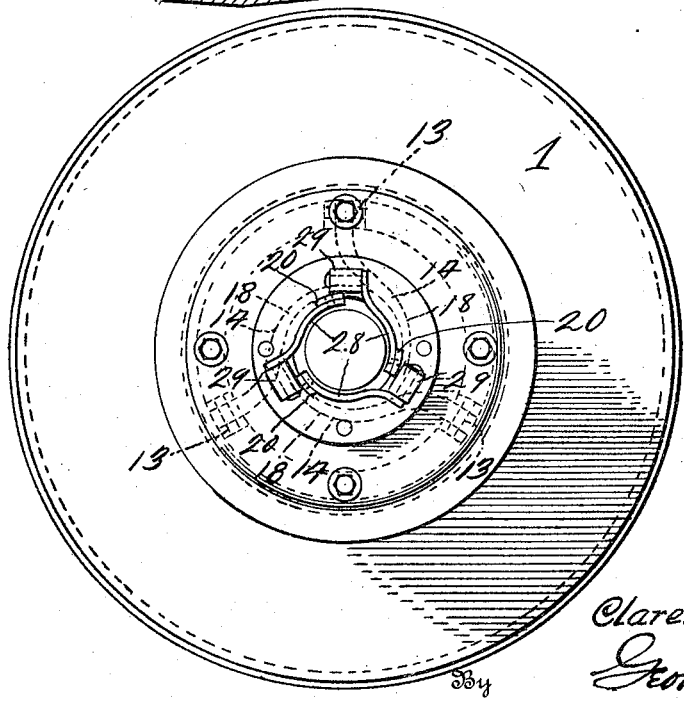
Figure 2 is a side elevation of the clutch and pulley showing the operating mechanism.

Referring to the drawings, the numeral 1 designates a pulley and 2 a driven shaft on which the pulley 1 is mounted and 3 anti-frictional bearings on which the pulley rotates. The driven shaft 2 extends through the pulley 1 and has keyed thereto at 4 a driven plate 5. The driven plate 5 rotates between friction discs 6 during the rotation of the shaft 2, and are adapted to be forced into frictional engagement with each other and with the bottom 7 of the chamber 8 carried by the pulley 1 when the pulley and the driven shaft are clutched together. To accomplish this locking or binding operation a clamping plate 9 is provided, said plate being disposed within the chamber 8 and guidable in its movement by a slot and pin connection 11 and 12, as clearly shown in Figure 1. Pivotally connected to the clamping plate 9 as at 13 are clamping levers 14, said clamping levers being provided with cam surfaces 15 which cooperate with bevelled surfaces 16 of an adjusting ring 17. It will be seen that when the inwardly extending arms 18 of the clamping levers 14 are forced inwardly that the pulley and driven shaft 2 will be frictionally engaged in such a manner that they will revolve together. Also that when the arms 18 of the levers 14 are forced outwardly, that the pressure on the ring 9 will be relieved, thereby allowing the driven plate to freely rotate between the friction discs 6.

The arms 18 extend inwardly and curve preferably at an arc greater than the radius of the driven shaft 2, however said arms terminate at points equally spaced from each other. Pivotally connected to the inner ends of the arms 18 as at 19 are substantially longitudinally disposed links 20, the outer ends of which are pivotally connected as at 21 to levers 22. The levers 22 are provided with short arms 23 and long arms 24. The short arms 23 are substantially longitudinally disposed in relation to the clutch as a whole and are pivotally connected at 25 to a ring 26 secured to the clutch casing 27. It will be seen that when the pivotal points 21 move away from an aligned position in relation to the pivotal points 19 and 25, that the arms 18 of the levers 14 will be moved outwardly, thereby moving the clamping plate 9 to inoperative position. However, it will also be seen that when the pivotal point 21 is moved in a direction towards an aligned position, with the pivotal points 19 and 25, that the levers 14 will be moved to an operative position, thereby forcing the clamping plate into frictional engagement with the friction discs 6 and driven plate for frictionally holding the clutch elements together. To accomplish this result the arms 24 are provided with arcuate portions 28 which terminate in rollers 29, said rollers being disposed in engagement with a slidable operating cone 30. When the rollers 29 are in engagement with the cone surface 31 and the cone is being moved in the direction of the arrow *a* it will be seen that the pivotal points 21 will be moved in the direction of an aligned relation to the pivotal points 19 and 25, thereby engaging the clutch.

However before the points 21 reach aligned positions in relation to the pivotal points 19 and 25 the rollers 29 pass from the cone surface 31 onto the cylindrical portion 32 of the operating cone, thereby holding the clamping levers in clamped position. It is to be understood that the operating cone 30 may be operated in any manner, and for purposes of illustration it is shown slidable on a shaft 33, which is in axial alignment with the driven shaft 2. The shafts 2 and 33, may be the same shaft or separate shafts, however they are preferably the same shaft.

From the above it will be seen that an operating mechanism for lever controlled clutches is provided, which mechanism is simple in construction and one wherein the levers are thrown to operative positions through the medium of bell crank and link connections, said bell cranks being rockable on their pivotal points by an operating cone.

The invention having been set forth what is claimed as new and useful is:—

1. The combination with a clutch, said clutch comprising a casing, a shaft extending axially through the casing, driven and driving members within said casing, levers for clutching said driven and driving members, said levers having arms extending towards the shaft and terminating in curved portions concentric with the shaft, of means for actuating said levers, said means comprising levers pivoted to the casing adjacent the sides of the shaft, longitudinally extending arms carried by said last named levers, link connections between said arms and the ends of the concentric portions of the first mentioned levers, said casing-pivoted levers extending away from the casing and longitudinally in relation to the shaft, and a cone slidably mounted on the shaft and cooperating with said last named levers.

2. The combination with a clutch, a shaft axially disposed in relation to said clutch, a series of pivoted levers for actuating the clutch, said levers having arms extending towards the shaft and terminating in circumferentially arranged portions, of means for moving the ends of the circumferentially arranged portions of the levers longitudinally in relation to the shaft, said means comprising links pivoted to said arms and extending longitudinally in relation to the shaft, bell crank levers disposed to the sides of the shaft, said bell crank levers being provided with angularly disposed arms, one of said arms being pivoted to the links at one of their ends and at fixed points at the other ends, longitudinally extending arms carried by said bell crank levers, a slidable cone mounted on the shaft, and rollers carried by said longitudinally extending arms and cooperating with the cone at a point substantially at a right angle to the pivotal points of the bell crank levers.

3. The combination with a clutch, said clutch being actuated by pivoted levers pivoted at points radially spaced from the clutch axis, a shaft, the arms of said levers extending circumferentially and terminating at points in relation to the shaft at substantially right angles to their pivotal points, bell crank levers pivoted at fixed points at substantially the same angle in relation to the shaft as the pivots of the arms of the levers, an actuating cone slidably mounted on the shaft, link connections between the bell crank levers and the actuating levers, said bell crank levers cooperating with the cone at points at substantially the same angle in relation to the shaft as the pivotal points of the first mentioned levers.

In testimony whereof I affix my signature.

CLARENCE G. WOOD.